US012643210B2

(12) United States Patent
Grandjean

(10) Patent No.: US 12,643,210 B2
(45) Date of Patent: Jun. 2, 2026

(54) FASTENER DRIVING TOOL

(71) Applicant: Illinois Tool Works Inc., Glenview, IL (US)

(72) Inventor: Pascale Grandjean, Bourg-lès-Valence (FR)

(73) Assignee: Illinois Tool Works Inc., Glenview, IL (US)

( * ) Notice: Subject to any disclaimer, the term of this patent is extended or adjusted under 35 U.S.C. 154(b) by 43 days.

(21) Appl. No.: 18/561,222

(22) PCT Filed: May 24, 2022

(86) PCT No.: PCT/US2022/030671

§ 371 (c)(1),
(2) Date: Nov. 15, 2023

(87) PCT Pub. No.: WO2022/251174

PCT Pub. Date: Dec. 1, 2022

(65) Prior Publication Data

US 2024/0269813 A1 Aug. 15, 2024

(30) Foreign Application Priority Data

May 26, 2021 (EP) .................................... 21175847

(51) Int. Cl.
*B25C 1/08* (2006.01)

(52) U.S. Cl.
CPC ..................................... *B25C 1/08* (2013.01)

(58) Field of Classification Search
CPC .. B25C 1/08; B25C 1/00; B25C 1/082; B25C 1/10; B25C 1/085; B25C 1/087; B25C 1/008
See application file for complete search history.

(56) References Cited

U.S. PATENT DOCUMENTS 6,123,241 A * 9/2000 Walter .................... B25C 1/008 227/8
2006/0065690 A1 3/2006 Fujisawa et al.
2010/0327039 A1* 12/2010 Adams ...................... B25C 1/08 227/9
2019/0162158 A1* 5/2019 Zurlo ................. F02D 41/1497

FOREIGN PATENT DOCUMENTS

CN 201917606 U 8/2011
EP 1878540 A1 1/2008
EP 2210710 A1 7/2010

OTHER PUBLICATIONS

International Search Report and Written Opinion from International Application No. PCT/US2022/030671, mailed Sep. 19, 2022 (10 pages).

* cited by examiner

*Primary Examiner* — Veronica Martin
(74) *Attorney, Agent, or Firm* — Neal, Gerber & Eisenberg LLP

(57) ABSTRACT

The present disclosure provides for a fastener driving tool, comprising: a combustion chamber having a first inlet port for inputting a first fluid having at least one variable fluid characteristic, and a second inlet port for inputting a second fluid; a piston configured to drive a fastener into a work surface; an ignition device configured to generate an electric arc within the combustion chamber to ignite within the combustion chamber a mixture of said first fluid and said second fluid, and a mechanism configured to measure an ionization current within the combustion chamber.

10 Claims, 3 Drawing Sheets

FASTENER DRIVING TOOL

PRIORITY CLAIM

This application is a national stage application of PCT/US2022/030671, filed on May 24, 2022, which claims priority to and the benefit of European Patent Application No. 21175847.9, which was filed on May 26, 2021, the entire contents of which is incorporated herein by reference.

The present disclosure relates to a fastener driving tool for fixation of parts by way of fasteners propelled by a driving piston under the effect of the combustion of one or more fluids. More specifically, the present disclosure relates to the control of the quality of the ignition and of the combustion of the mixture of fluids within such a tool.

BACKGROUND

Fastener driving tools include devices for driving fixation elements or fasteners, such as a nail or a staple, designed to be anchored in a material composing a work surface. A known tool is generally illustrated in FIG. 1, including a housing 1 with a handle 9 for grasping and handling and shooting, on which is mounted a trigger 10. The tool is gas-powered (i.e., the housing 1 is provided with an internal combustion engine 2 to generate a driving force for propulsion of a piston designed to drive a nail into the work surface). The engine 2 includes at least one combustion chamber 3 configured to contain a mixture of fluids suitable for combustion. Igniting the mixture by an internal ignition device provides a driving force, thereby propelling the piston to drive the nail through the exit of a guide tip 5. Ignition of the ignition device is initiated by the user depressing the trigger 10 so as to generate an electric arc in the combustion chamber.

A combustible fluid mixture, typically an air and fuel mixture, is provided to the combustion chamber 3 for ignition. Fuel, such as a combustible gas or liquid, is moved into the combustion chamber 3 by way of injection from a gas cartridge 4 retained in the housing 1. Air may be drawn into the combustion chamber 3 from the surrounding atmosphere by an electric fan.

A known problem of such fastener tools is that combustion is often not optimized, thus, reducing tool efficiency, which leads to a loss of power in the tool and therefore to poor fastening quality, or even having no explosion. Also, currently available tools are not capable to adapt to different environmental conditions (e.g. varying atmospheric pressure and/or temperature) leading to a potentially ineffective and poor performance.

It is therefore an advantage of the present disclosure to provide a fastener driving tool with improved combustion efficiency.

In particular, it is an advantage of the present disclosure to provide a tool configured to allow to monitor the quality of the ignition and of the combustion of the mixture of fluids within such a tool.

SUMMARY

According to a first aspect of the present disclosure, there is provided a fastener driving tool, comprising:

- a combustion chamber having a first inlet port for inputting a first fluid having at least one variable fluid characteristic, and a second inlet port for inputting a second fluid;
- a piston designed to drive a fastener into a work surface;
- an ignition device configured to generate an electric arc within the combustion chamber in order to ignite within the combustion chamber a mixture of said first fluid and said second fluid,
- wherein the fastener driving tool further comprises a mechanism configured to measure a ionization current within the combustion chamber.

The ionization current measurement mechanism according to the present disclosure enables the detection of anomalies in the combustion by measuring the ionization current in the chamber under compression and after the spark, as well as the detection of the type of anomaly, for example a misfire corresponding to the failure of a combustion, or soot generated by the ignition device (for instance a spark plug) or occurrence of ringing within the combustion chamber.

According to an aspect of the present disclosure, the mechanism to measure a ionization current within the combustion chamber comprise a ionization sensor.

Advantageously, the fastener driving tool comprises a mechanism to generate a signal representative of an information measured by the ionization sensor.

According to an aspect of the present disclosure, said information measured by the ionisation sensor comprise any one of (i) a dysfunction of the ignition, and (ii) an improper use of said fastener driving tool by a user.

Advantageously, the sensor can detect dysfunction of the ignition such as ringing as well as misfiring and any other incorrect actuation.

Advantageously, the fastener driving tool further comprises:

- a fan assembly, operably coupled to said first inlet port, configured to switch between a first open state, allowing said first fluid to move into said combustion chamber and a first closed state, preventing or at least limiting said first fluid from moving into said combustion chamber;
- a fluid valve, operably coupled to said second inlet port, configured to switch between a second open state, allowing said second fluid to move into said combustion chamber, and a second closed state, preventing said second fluid from moving into said combustion chamber;
- a controller, configured to operate any one of said fan assembly and fluid valve and to control a time interval of said first open state and/or said second open state.

Advantageously, the fastener driving tool comprises a mechanism configured to deactivate the fan assembly, said mechanism configured to deactivate the fan assembly comprising a switch between the fan assembly and a power supply.

Advantageously, said first fluid is ambient air.

According to an aspect of the present disclosure, said second fluid is a combustible fuel.

Advantageously, the combustion chamber comprises an outlet port comprising a third actuator which is configured to switch between an 'open state', in which combustion chamber is vented to the atmosphere, and a 'closed state' in which said combustion chamber (110) is prevented from venting.

BRIEF DESCRIPTION OF THE DRAWINGS

Embodiments of the present disclosure are now described, by way of example only, hereinafter with reference to the accompanying drawings, in which.

In the drawings, like reference numerals refer to like parts.

DETAILED DESCRIPTION

As used herein, the terms 'connected', 'attached', 'coupled', 'operated' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner.

Figure 1:
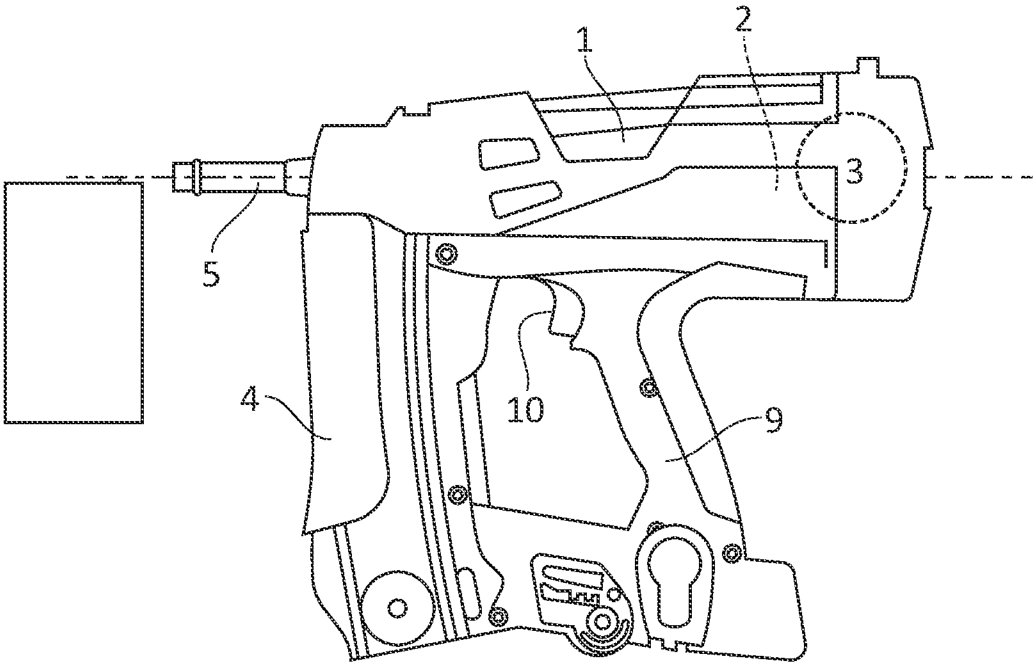
FIG. 1 (Prior Art)
FIG. 1 shows a side view of a fastener driving tool of the prior art.
Figure 2:
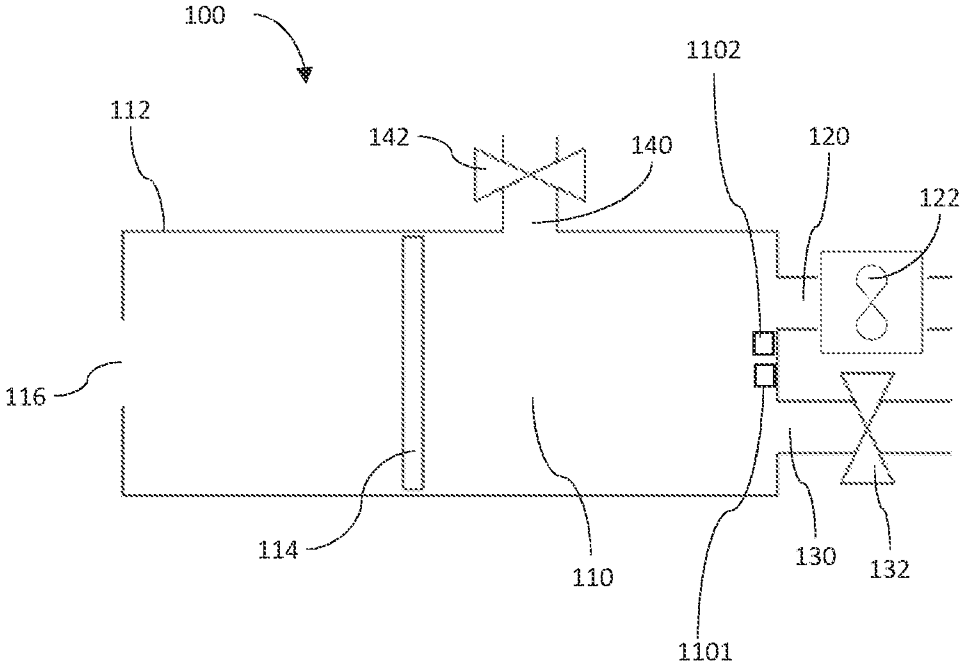
FIG. 2 shows a schematic view of an example embodiment of the fastener driving tool of the present disclosure.

Referring now to FIG. 2, an example embodiment of a fastener driving tool 100 is shown according to the present disclosure. The fastener driving tool 100 includes a combustion chamber 110 with first and second inlet ports 120, 130 for inputting respective first and second fluids into the combustion chamber 110. The first fluid may be air, and the second fluid may be a standard fuel. The first inlet port 120 includes a first actuator 122, and the second inlet port 130 includes a second actuator 132. Each one of the first and second actuators 122, 132 is configured to switch between an open state, allowing the respective first or second fluid to move into the combustion chamber 110 at a respective first or second mass flow rate, and a closed state, in which respective first and second fluid is prevented from moving into the combustion chamber 110. A controller (not shown) is configured to operate any one of the first and second actuators 122, 132 and control the time interval of the 'open state(s)' based on at least one predetermined parameter in order to provide a predetermined mass ratio of the first and second fluids within the combustion chamber 110.

In this particular example, the first actuator is a fan assembly 122 that is configured to switch between an open and a closed state. When in the 'open state' the fan assembly 122 is activated so as to draw in air from the ambient atmosphere and move it into the combustion chamber 110. According to an aspect of the present disclosure, the fastener driving tool 100 comprises a mechanism configured to deactivate the fan assembly 122 when in said first 'closed state'. Advantageously, the fastener driving tool 100 comprises a mechanism configured to activate and/or deactivate the fan assembly 122. When in the 'closed state', the fan assembly 122 is deactivated. Activation and deactivation of the fan 122 may simply be provided by a switch between the fan assembly 122 and its power supply.

The second actuator may be a valve assembly 132 configured to switch between an 'open state' and a 'closed state'. The valve assembly 132 is operably connected to a fuel source, for example, in the form of a pressurised cartridge configured to provide combustible fluid at constant, elevated pressure. When in the 'open state', the valve assembly 132 allows combustible fluid to move into the combustion chamber 110 from the fuel source. When in the 'closed state' the fuel source is isolated from the combustion chamber 110.

Furthermore, the combustion chamber 110 is provided with an outlet port 140 having a third actuator 142 that is configured to switch between an 'open state', in which combustion chamber 110 is vented to the atmosphere, and a 'closed state' in which the actuator 132 prevents venting.

The fastener driving tool 100 is further provided with a cylinder 112 extending between the combustion chamber 110 at a proximal end of the cylinder 112 and an exit 116 at a distal end. The exit 116 leads to a guide tip on the front of the fastener driving tool 100 configured to direct a fastener (e.g. nail) into a work surface. A piston 114 is provided in the cylinder 112, configured to move from the proximal end towards the distal end under a driving force provided from within the combustion chamber 110. The piston 114 is designed to drive a fastener (not illustrated) into a work surface.

An ignition device 1101, such as, for example, a spark plug 1101, is provided within the combustion chamber 110, configured to generate an electric arc (i.e. a spark) in order to ignite within the combustion chamber 110 the mixture of said first fluid and said second fluid. The spark plug 1101 ignites the combustible fluid mixture within the combustion chamber 110. Ignition is typically initiated by the user depressing a trigger of the fastener driving tool 100. The fastener driving tool 100 further comprises a mechanism configured to measure a ionization current (e.g. an ionisation sensor) 1102 within the combustion chamber 110. The mechanism configured to measure a ionization current within the combustion chamber 110 comprises an ionization sensor 1102.

The ionisation sensor 1102, as the one used for this present disclosure, is one as known in the art and is suitable for a spark plug or ignition system of a combustion system. In particular, the ignition system comprises, inter alia, an inductor or solenoid having a primary and secondary coil. The ionisation sensor 1102 may be provided by operably coupling the secondary coil to the spark plug, as well as, a measurement circuit for measuring the ionisation current. The measurement circuit may comprise an amplifier for amplifying the ionisation current and a converter for converting the ionisation current into voltage signal.

The tool 100 further comprises a mechanism to generate a signal representative of an information measured by the ionization sensor 1102.

Preferably, the information measured by the ionisation sensor may comprise information of any one of a dysfunction of the ignition and the improper use of the tool 100 by an operator.

The ionisation current measured within the combustion chamber 110 can be utilised as an indication of the quality of the ignition within the tool 100.

Thus, the present disclosure allows for (i) the detection of potential anomalies within the combustion chamber 110 by simply measuring the ionization current within the combustion chamber 110 under compression and after the spark ignition, as well as, (ii) the detection of the type of anomaly, for example, a misfire corresponding to failure of combustion, or soot generated by the ignition device (i.e. the spark plug) or the occurrence of ringing noise (knocking) within the combustion chamber 110.

The operation of the fastener driving tool 100 will now be described with further reference to FIG. 3 which shows a simplified schematic illustration of the control system 150. In particular, the control system 150 is provided with a controller 152 configured to provide independent digital output signals to first and second power drivers 124, 134.

Further, the control system 150 is configured to control and power the spark plug 1101, as well as, the ionisation sensor 1102 and comprises a mechanism configured to process at least an information measured by the ionisation sensor 1102.

For instance, such information may be a dysfunction of the ignition, such as, for example, a ringing or misfiring, but also any other faulty actuation. The information may also be based on an improper use of the fastener driving tool 100 by a user. Other information may be anomalies during the combustion by measuring the ionization current within the combustion chamber 110 under compression and after spark ignition, as well as, the detection of the type of anomaly, for example a misfire corresponding to the failure of a combustion, or soot generated by the ignition device (for instance a spark plug) or occurrence of ringing within the combustion chamber 110.

Further, the control system 150 of the present disclosure comprises a mechanism configured to count and record any ignition dysfunction (or anomalies of the combustion) occurrences or any information representative of ignition dysfunction (or anomalies of the combustion) occurrences, and provide a signal representative of any one of the information extracted. The control system 150 is further configured to transmit a signal to a remote network, to a user receiver, and/or to a display (e.g. a maintenance signal) or any other suitable user interface configured to notify the user of an occurrence or fault in the tool (e.g. an LED lamp coupled to the tool for a visual indication of a fault or improper use).

During use, the output signal provided to the first power driver 124 causes the first power driver 124 to switch the fan assembly 122 between its 'open state' and 'closed state'. Thus, by varying the output signal to the first power driver 124, the controller 152 is able to control the time intervals for respective 'open state' and 'closed state' of the fan assembly 122.

At the same time, the controller 152 monitors (the controller comprises a mechanism to monitor the electric current consumed by the first actuator 122) the electric current consumed by the fan assembly 122 via sensor 126 (the mechanism configured to monitor the electric current consumed by the first actuator comprise a sensor). This information can be used to generate a feedback signal from the sensor to the controller 152 via a signal convertor 154. The controller 152 is thus able to determine the electric current consumed by the fan assembly 122 during its 'open state' or 'closed state'.

The output signal provided to the second power driver 134 causes the second power driver 134 to switch the valve assembly 132 between its 'open state' and its 'closed state'. In this way, the controller 152 controls the time interval of respective 'open state', as well as, 'closed state' of the valve assembly 132. The controller 152 comprises a mechanism configured to control the time interval of respective 'second open state' and 'second closed state' of the valve assembly 132 (second actuator).

When the fastener driving tool 100 is in use, the combustion chamber 110 is prepared for a firing cycle by inputting a mixture of air and fuel to the chamber 110. The controller 152 provides an output signal to the first power driver 124 causing the fan assembly 122 to switch to an 'open state' and thereby move air into the combustion chamber 110. The controller 152 provides an output signal to the second power driver 134 causing the valve assembly 132 to switch into an 'open state' and thereby move fuel into the combustion chamber 110. In the example shown, the controller 152 provides the output signals sequentially so that air is provided to the combustion chamber 110 before fuel. However, equally, the controller 152 may provide output signal(s) which provide the air and fuel in any suitable sequence, including wholly or partly within the same time period.

When in the 'open state', the fan assembly 122 draws air into the combustion chamber 110 at a first mass flow rate. The specific mass flow rate during an individual 'open state' is dependent on the characteristics of the ambient air itself at that time. In particular, the inventor has appreciated that the first mass flow rate depends on the ambient atmospheric pressure. Thus, when the atmospheric pressure is low, for example, if the fastener driving tool 100 is used at high altitude, then the air density is relatively low and the electrical current consumed by the fan assembly 122 is correspondingly lower (compared to a standard mass flow rate at standard environmental conditions). Conversely, when atmospheric pressure is high, for example, if the fastener driving tool 100 is used at low altitude, then the air density is higher and the electrical current consumed by the fan assembly 122 is correspondingly higher.

As the electrical current consumed by the fan assembly 122 is monitored by sensor 126 during any 'open state' and then fed back to the controller 152, the controller 152 is able to determine the air mass flow rate and the mass of air inputted into the combustion chamber 110 for the upcoming firing cycle (e.g. interpolation from the performance data of the fan assembly at different electrical current consumptions).

When the valve assembly 132 is switched to the 'open state' by the controller 152, the elevated pressure of the fuel source causes combustible fluid to move into combustion chamber 110 at a predetermined fuel mass flow rate. The time interval for the second 'open state' is determined by the controller 152 based on the feedback signal of the sensor 126 (i.e. the current air mass flow rate and the amount of air moving into the chamber) in order to adapt the mass of fuel moved into the combustion chamber 110, so as to optimise the fuel/air mixture for optimal combustion. Therefore, an optimum fuel/air mixture is provided irrespective of the ambient atmospheric pressure or any other environmental parameter.

Once the optimal fuel/air mixture has entered the combustion chamber 110, the firing cycle commences igniting the mixture by the ignition device, generating a driving force to propel the piston and drive a fastener into a work surface.

After firing and combustion is complete, the combusted fluids are purged from the combustion chamber 110 in readiness for preparing the next firing cycle. Thus, the third actuator 142 is switched to an 'open state', via a third power driver (not shown), by the controller 152 to allow the combusted fluids to be vented into the atmosphere. In order to accelerate the venting, the controller 152 switches the fan assembly 132 into an 'open state' to simultaneously draw fresh air into the combustion chamber 110 and displace the combusted fluids vented through the outlet port 140. With the combusted fluids purged, the controller 152 is ready to initiate preparation for the next firing cycle.

In the example embodiment the controller 152 bases the time interval of the valve assembly 'open state' on the electrical current consumed by the fan assembly 122 during preparation for the firing stage. In other words, the electrical current consumed by the fan assembly 122 when the outlet port 140 is closed.

Alternatively, the controller 150 may base the time interval on the current consumed by the fan assembly 122 when the third actuator 142 is open. In other words, the controller 152 may respond to feedback from the sensor 126 when the fan assembly 122 is providing air to displace combusted fluids in the combustion chamber. To this extent, when controlling a time interval, the controller 152 may evaluate, whether the third actuator 142 is in an 'open state' or 'closed state', in order to determine its response to the feedback of the sensor 126.

Additionally, it is understood by the person skilled in the art that the control system 150 may base a time interval ('closed state' and/or 'open state') of either one of the first or second actuator 122, 132 on any other indicator signal suitable for determining the ambient atmospheric pressure. The indicator may be a direct measurement, for example, from a pressure sensor directly coupled to the control system 150, or a pressure measurement from a pressurised fluid source. Further, the indicator signal may be provided by one or more indirect measurement, such as, for example, the rotational speed of the fan assembly 122, or a flow rate measurement device suitably positioned e.g. at the inlet port of the fan assembly 122. The indicator signal may also be provided from a remote sensor, for example, atmospheric data provided from another device over a suitable wired or wireless connection, e.g. a mobile phone application.

Additionally, or alternatively, the control system 150 may base the time interval of the 'open state' of any one of the first or second actuator 122, 132 on any other data suitable to derive the amount of air and/or fuel mass moved into the combustion chamber 110 at a predetermined time interval, e.g. ambient temperature or relative humidity.

Any indicator signal, data or measurement provided to the control system 150 may be provided directly or via a suitable intermediary module, for example an analogue-to-digital convertor or wireless receiver.

Any suitable actuators capable of providing fluids to the combustion chamber may be used, in any appropriate combination. For example, pumps or injectors, or any other device or apparatus capable of selectively inputting fluids for a time interval controlled by the controller. Any such devices or apparatus may include or exclude additional features required to enable them to function with a fastener driving tool.

Figure 3:
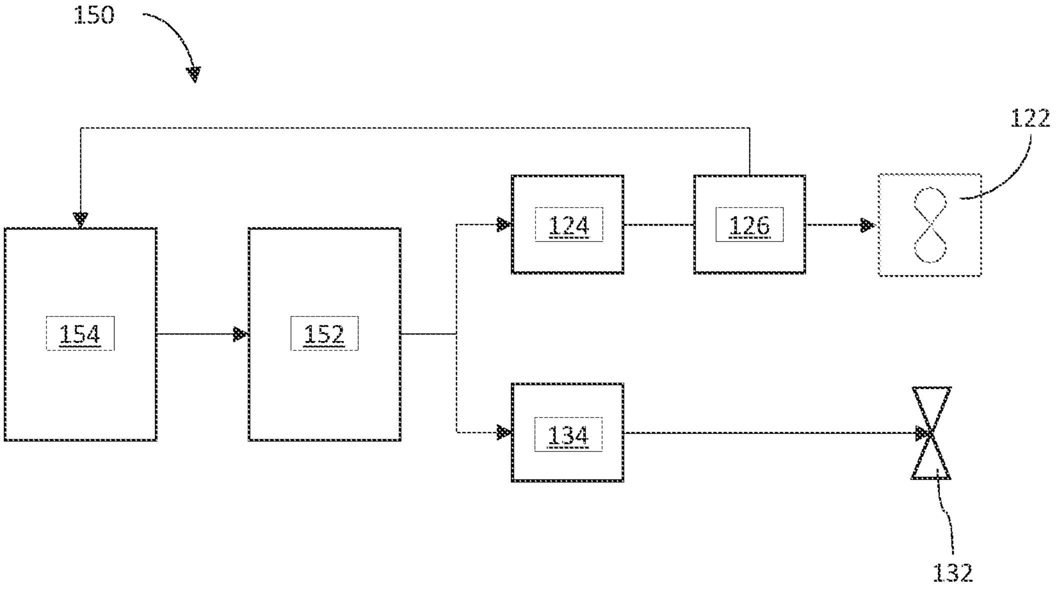
FIG. 3 shows a schematic layout of the control system of the example embodiment of FIG. 2.

In example embodiment of FIGS. 2 and 3, the control system 150 controls the time interval of the second actuator 132 based on a parameter associated with the first actuator 122, so that the time interval of the constant pressure fuel source is controlled depending on a variable characteristic of the ambient atmospheric air. However, other control mechanisms are possible, which allow either one (or both) of the time intervals to be controlled based on characteristics of one or both fluids. For example, the time interval of the actuator inputting a fluid with a variable characteristic, such as air, may be based on the fixed pressure and time interval of a fluid provided from a pressurised fluid cartridge. Thus, many variations and combinations of parameters and controls may be configured such that the final mixture of fluids within the combustion chamber contains an optimum mass ratio for the specific fluids being used.

Additionally, or alternatively, the control system 150 may adapt to varying fluids such that the time intervals may be adjusted to provide different mass ratios depending on the fluids being used.

Through the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the present disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The present disclosure is not restricted to the details of any foregoing embodiments. The present disclosure extends to any novel one, or any novel combination, of the features disclosed in this specification (including any accompanying claims, abstract or drawings), or to any novel one, or any novel combination, of the steps of any method or process so disclosed.

It will be appreciated by persons skilled in the art that the above embodiment(s) have been described by way of example only and not in any limitative sense, and that various alterations and modifications are possible without departing from the scope of the present disclosure as defined by the appended claims. Various modifications to the detailed designs as described above are possible.

REFERENCE LIST

1 Housing
2 Combustion engine
3 Combustion chamber
4 Gas cartridge
5 Guide tip
9 Handle
10 Trigger
100 Fastener driving tool
110 Combustion chamber
112 Cylinder
114 Piston
116 Exit
120 First inlet port
122 Fan assembly
124 First power driver
126 Sensor measuring current consumed by fan
130 Second inlet port
132 Valve assembly
134 Second power driver
140 Outlet port
142 Third actuator
150 Control system
152 controller
154 Converter
1101 Spark plug
1102 Ionization sensor

The invention claimed is:

1. A fastener driving tool comprising:
a combustion chamber having:
a first inlet port configured to receive a first fluid having at least one variable fluid characteristic,
a second inlet port configured to receive a second fluid, and an outlet port;

a first actuator configured to switch between a first open state to allow the first fluid to move into the combustion chamber and a first closed state to prevent the first fluid from moving into the combustion chamber;

a second actuator configured to switch between a second open state to allow the second fluid to move into the combustion chamber and a second closed state to prevent the second fluid from moving into the combustion chamber;

a third actuator switchable between a third open state in which the combustion chamber is vented to the atmosphere and a third closed state in which the combustion chamber is prevented from venting;

a first power driver configured to switch the first actuator between the first open state and the first closed state;

a second power driver configured to switch the second actuator between the second open state and the second closed state;

a third power driver configured to switch the third actuator between the third open state and the third closed state;

a piston configured to drive a fastener into a work surface;

an ignition device configured to generate an electric arc within the combustion chamber to ignite within the combustion chamber a mixture of the first fluid and the second fluid;

an ionization sensor located within the combustion chamber, separate from the ignition device, and configured to measure an ionization current within the combustion chamber; and a signal generator configured to generate a signal representative of information measured by the ionization sensor, wherein the information measured by the ionization sensor comprises an improper use of the fastener driving tool.

2. The fastener driving tool of claim 1, wherein the information measured by the ionization sensor further comprises a dysfunction of the ignition.

3. The fastener driving tool of claim 1, wherein:

the first actuator includes a fan assembly operably coupled to the first inlet port;

the second actuator includes a fluid valve operably coupled to the second inlet port; and and which includes a controller configured to provide independent digital output signals to the first power driver, the second power driver, and the third power driver to control a first time interval of said first open state, a second time interval of said second open state, and a third time interval of said third open state, respectively.

4. The fastener driving tool of claim 3, which includes a switch electrically connected between the fan assembly and a power supply, the switch configured to deactivate the fan assembly.

5. The fastener driving tool of claim 1, wherein the first fluid is ambient air.

6. The fastener driving tool of claim 5, wherein the second fluid is a combustible fuel.

7. A fastener driving tool comprising:

a combustion chamber configured to receive a first fluid and configured to receive a second fluid, wherein the first fluid is ambient air and the second fluid includes a combustible fuel, and including a first inlet port, a second inlet port, and an outlet port;

a first actuator configured to switch between a first open state to allow the first fluid to move into the combustion chamber and a first closed state to prevent the first fluid from moving into the combustion chamber;

a second actuator configured to switch between a second open state to allow the second fluid to move into the combustion chamber and a second closed state to prevent the second fluid from moving into the combustion chamber;

a third actuator switchable between a third open state in which the combustion chamber is vented to the atmosphere and a third closed state in which said combustion chamber is prevented from venting;

a first power driver configured to switch the first actuator between the first open state and the first closed state;

a second power driver configured to switch the second actuator between the second open state and the second closed state;

a third power driver configured to switch the third actuator between the third open state and the third closed state;

a controller configured to provide independent digital output signals to the first power driver, the second power driver, and the third power driver to control a first time interval of the first open state, a second time interval of the second open state, and a third time interval of the third open state, respectively;

a piston configured to drive a fastener into a work surface;

an ignition device configured to generate an electric arc within the combustion chamber to ignite within the combustion chamber a mixture of the first fluid and the second fluid;

an ionization sensor located within the combustion chamber, separate from the ignition device, and configured to measure an ionization current within the combustion chamber; and a signal generator configured to generate a signal representative of information measured by the ionization sensor, wherein the information measured by the ionization sensor comprises an improper use of the fastener driving tool.

8. The fastener driving tool of claim 7, wherein the information measured by the ionization sensor further comprises a dysfunction of the ignition.

9. The fastener driving tool of claim 7, wherein:

the first actuator includes a fan assembly; and the second actuator includes a fluid valve.

10. The fastener driving tool of claim 9, which includes a switch electrically connected between the fan assembly and a power supply, the switch configured to deactivate the fan assembly.

* * * * *